United States Patent [19]
Yahagi

[11] Patent Number: 5,459,615
[45] Date of Patent: Oct. 17, 1995

[54] MINIATURE FIXED-FOCAL-LENGTH LENS SYSTEM

[75] Inventor: Satoshi Yahagi, Saitama, Japan

[73] Assignee: Fuji Photo Optical Co., Ltd., Saitama, Japan

[21] Appl. No.: 80,103

[22] Filed: Jun. 23, 1993

[30] Foreign Application Priority Data

Oct. 16, 1992 [JP] Japan .................................. 4-278621

[51] Int. Cl.⁶ .................................................. G02B 15/14
[52] U.S. Cl. ........................... 359/672; 359/673; 359/721
[58] Field of Search ................................ 359/721, 672, 359/673, 678

[56] References Cited

U.S. PATENT DOCUMENTS 3,008,373  11/1961  Lange ..................................... 359/673
4,391,493  7/1983  Tajima et al. .......................... 359/673

*Primary Examiner*—Scott J. Sugarman
*Attorney, Agent, or Firm*—Sixbey, Friedman, Leedom & Ferguson; Gerald J. Ferguson, Jr.; Evan R. Smith

[57] ABSTRACT

A miniature fixed-focal-length lens system includes a lens group which consists of a plurality of lenses and has a positive refracting power and a stop disposed on the object side of the lens group. The lens nearest to the object in the lens group is a meniscus lens which is concave to front and has a positive refracting power and the lens remotest from the object in the lens group is a lens which is convex to rear and has a positive refracting power.

18 Claims, 7 Drawing Sheets

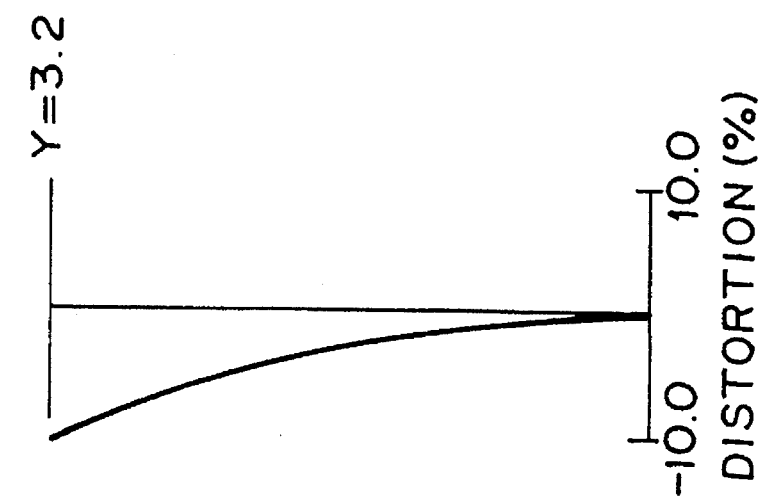
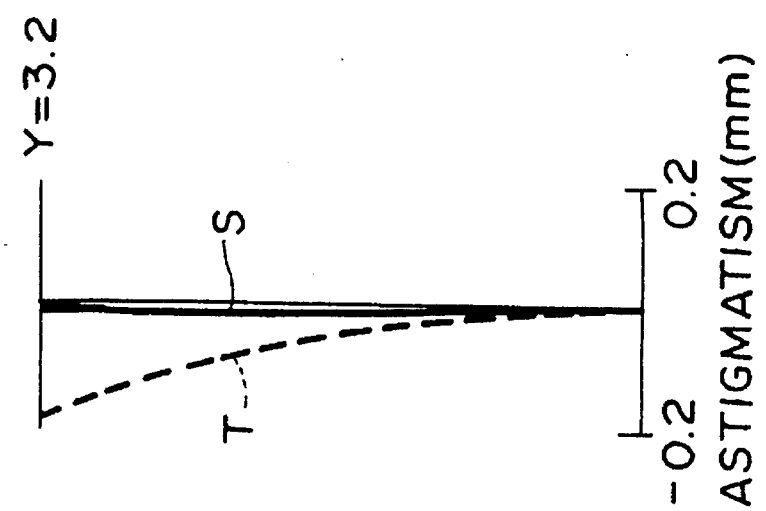
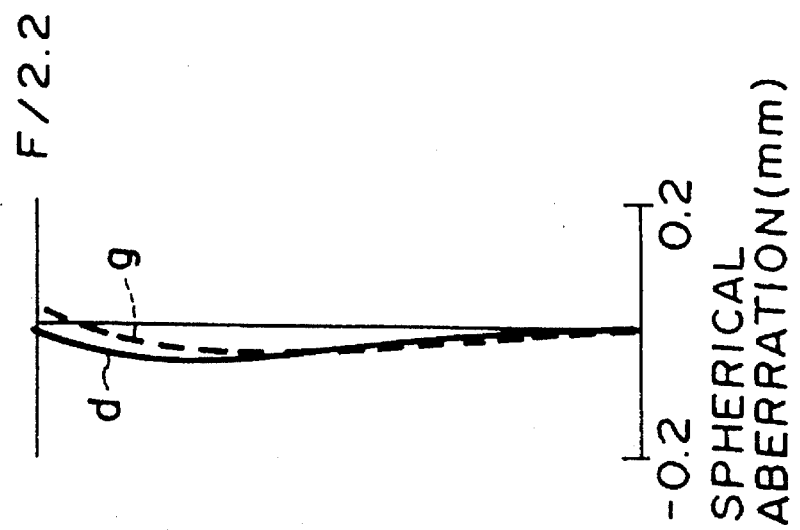

SPHERICAL ABERRATION(mm)
-0.2 ... 0.2

ASTIGMATISM(mm)
-0.2 ... 0.2

DISTORTION (%)
-10.0 ... 10.0

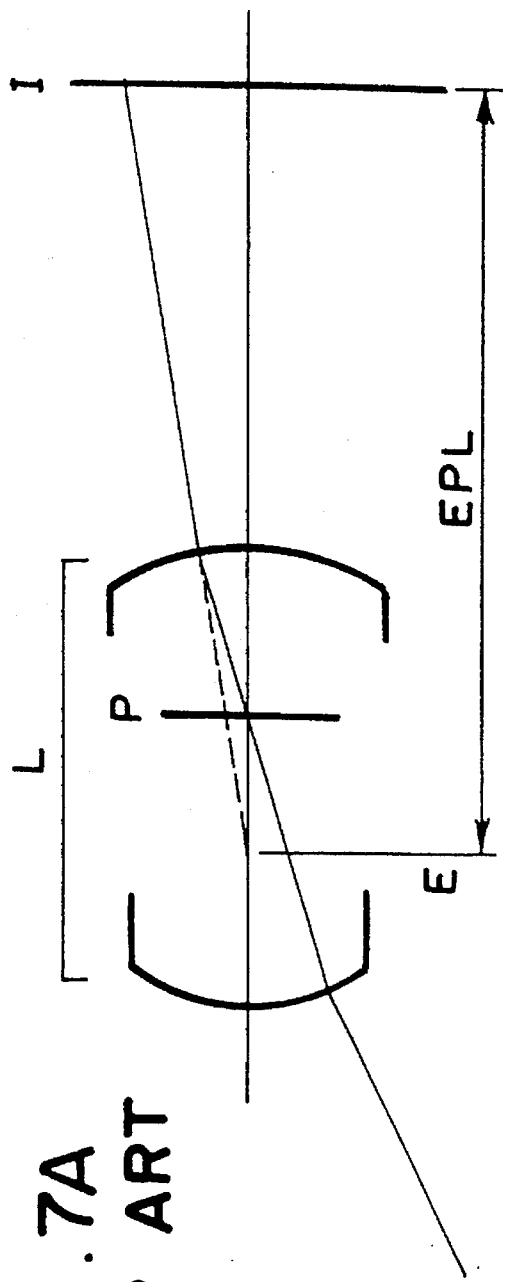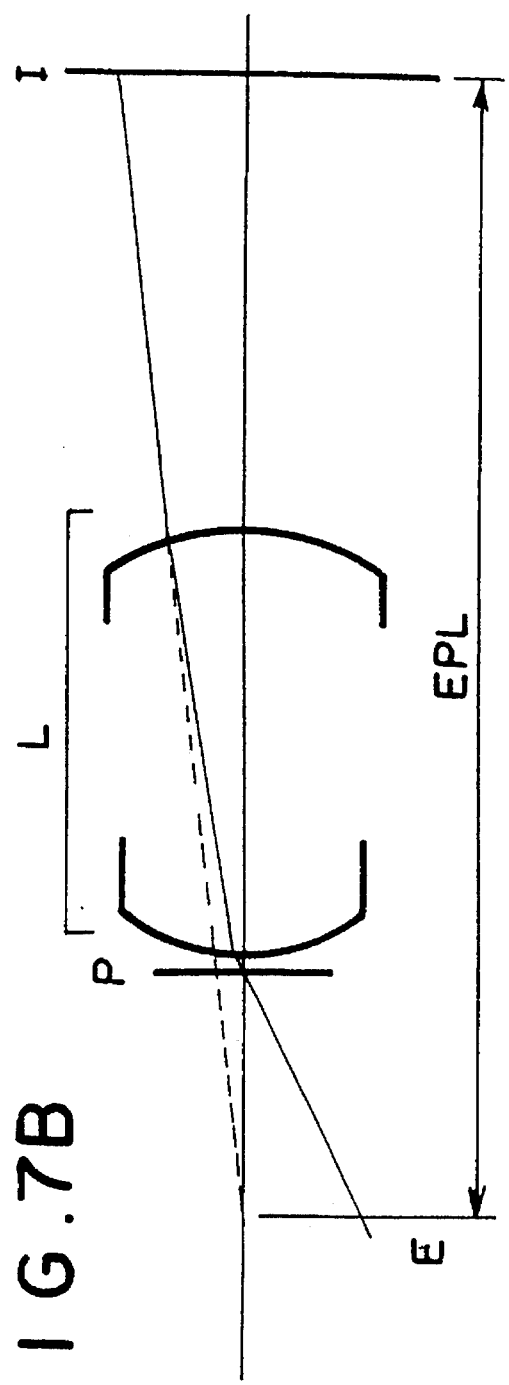

MINIATURE FIXED-FOCAL-LENGTH LENS SYSTEM

BACKGROUND OF THE INVENTION

1. Field of the Invention

This invention relates to a miniature fixed-focal-length lens system which is especially suitable for use in a video camera or a still-video camera in which a solid state image sensor is employed, and more particularly to such a fixed-focal-length lens system which can be used as a dual-focal-length lens system in combination with an afocal wide convertor which is selectively positioned in front (the object side) of the fixed-focal-length lens system to switch the focal length of the overall lens system.

2. Description of the Prior Art

There has been known a dual-focal-length lens system which comprises a stationary lens group and a movable lens group and whose focal length can be switched between two values by positioning the movable lens group in front of the stationary lens group and removing therefrom. Such a dual-focal-length lens system is frequently employed in a video camera or a still-video camera, a video camera which is also capable of taking a still photo. The movable lens group is typically an afocal lens system which is generally called 'convertor' and generally comprises a first lens group having a negative refracting power and a second lens group having a positive refracting power. Further the lens of the stationary lens group nearest to the object is generally a positive lens convex to the object.

In a video camera or a still-video camera, a solid state image sensor (e.g., CCD) is frequently employed and when the angle of incidence of the imaging light to the image plane is large, eclipse occurs at the light incident end of each element of the image sensor and a so-called shading is generated in reproduced images. In order to prevent generation of shading, the exit pupil of the lens system must be at a distance from the image surface so that the angle of incidence of the imaging light to the image plane is small.

For such a purpose, the stop must be positioned on the object side of the lens system.

That is, referring to FIGS. 7A and 7B, when the stop P is inside the lens system L as shown in FIG. 7A, the stop P is remote from the front focal point and as a result the exit pupil is positioned close to the image surface I. On the other hand, when the stop P is positioned on the object side of the lens system L as shown in FIG. 7B, the stop P is positioned close to the front focal point and as a result the exit pupil can be positioned remote from the image surface I.

In the aforesaid known lens system, the stop is positioned inside the stationary lens group and accordingly the exit pupil is apt to be positioned close to the image surface. Especially when the lens system is arranged to be compact in size, it becomes more difficult to position the exit pupil remote from the image surface.

When the movable lens group is positioned in front of the stationary lens group to set the focal length shorter (wide angle), the stop is remote from the movable lens group because it is inside the stationary lens group, which is very disadvantageous to correction of aberrations, and accordingly arrangement of the lenses in the movable lens group becomes complicated, whereby the overall lens system becomes larger in length and in diameter of the front lens.

SUMMARY OF THE INVENTION

In view of the foregoing observations and description, the primary object of the present invention is to provide a miniature fixed-focal-length lens system which, when used in a video camera or a still-video camera having a solid state image sensor, can prevent shading in images and which can be small in aberrations.

The fixed-focal-length lens system in accordance with the present invention comprises a lens group which consists of a plurality of lenses and has a positive refracting power and a stop disposed on the object side of the lens group and is characterized in that the front lens (the lens nearest to the object) is a meniscus lens which is concave to front and has a positive refracting power and the backmost lens is a lens which is convex to rear and has a positive refracting power.

If the front lens is convex to front, the rays entering the front lens are narrowed in diameter and approaches the optical axis after passing therethrough. Accordingly in order to set the back focus of the overall lens system suitable for use with a solid state image sensor, complicated arrangement of the other lenses becomes necessary. On the other hand, if the front lens is concave to front, the rays entering the front lens are enlarged in diameter and hop high after passing therethrough. Accordingly, the back focus of the overall lens system can be easily elongated without complicating the arrangement of the other lenses. Further, if the front lens has a negative refracting power, the other lenses must share large refracting power in order to let the overall lens system have a positive refracting power, which makes difficult correction of aberrations. This problem can be avoided when the front lens has a positive refracting power.

Further if the backmost lens is concave to rear, the main light rays emanating from the backmost lens are generally refracted in a direction in which the angle to the optical axis increases and as a result, the exit pupil approaches the image surface. On the other hand, if the backmost lens is convex to rear and has a positive refracting power, the main light rays emanating from the backmost lens are refracted in a direction in which the angle to the optical axis reduces and as a result, the exit pupil becomes remote from the image surface.

Thus in accordance with the present invention, the exit pupil can be remote from the image surface and accordingly shading in images can be prevented and aberrations of the lens system can be minimized.

In one preferred embodiment of the present invention, the fixed-focal-length lens system satisfies the following condition $$10 < |(R_2+R_1)/(R_2-R_1)| < 22 \tag{1}$$

wherein R1 and R2 respectively represent the radii of curvature of the front and rear faces of the meniscus lens.

When the condition (1) is satisfied, the spherical aberration of the lens system is minimized and at the same time, production efficiency is improved and interference with the stop can be prevented. That is, when $|(R_2+R_1)/(R_2-R_1)|$ exceeds the upper limit, the spherical aberration is overcorrected, and when it falls below the lower limit, the correction of the spherical aberration becomes insufficient. Further when $|(R_2+R_1)/(R_2-R_1)|$ falls below the lower limit, production of the lens becomes difficult and interference with the stop can occur.

In another preferred embodiment of the present invention, the fixed-focal-length lens system satisfies the following condition $$5 < f_m/f_b < 12 \quad (2)$$

wherein fm and fb respectively represent the focal lengths of the meniscus lens and the overall lens system.

When the condition (2) is satisfied, the spherical aberration and the coma are both minimized. That is, when $f_m/f_b$ exceeds the upper limit, the spherical aberration is overcorrected and at the same time an inward coma is generated, and when it falls below the lower limit, an outward coma is generated.

Aberrations generated when neither the condition (1) nor the condition (2) is satisfied are difficult to correct by changing the shape of the other lenses.

DESCRIPTION OF THE PREFERRED EMBODIMENT

Figure 1:
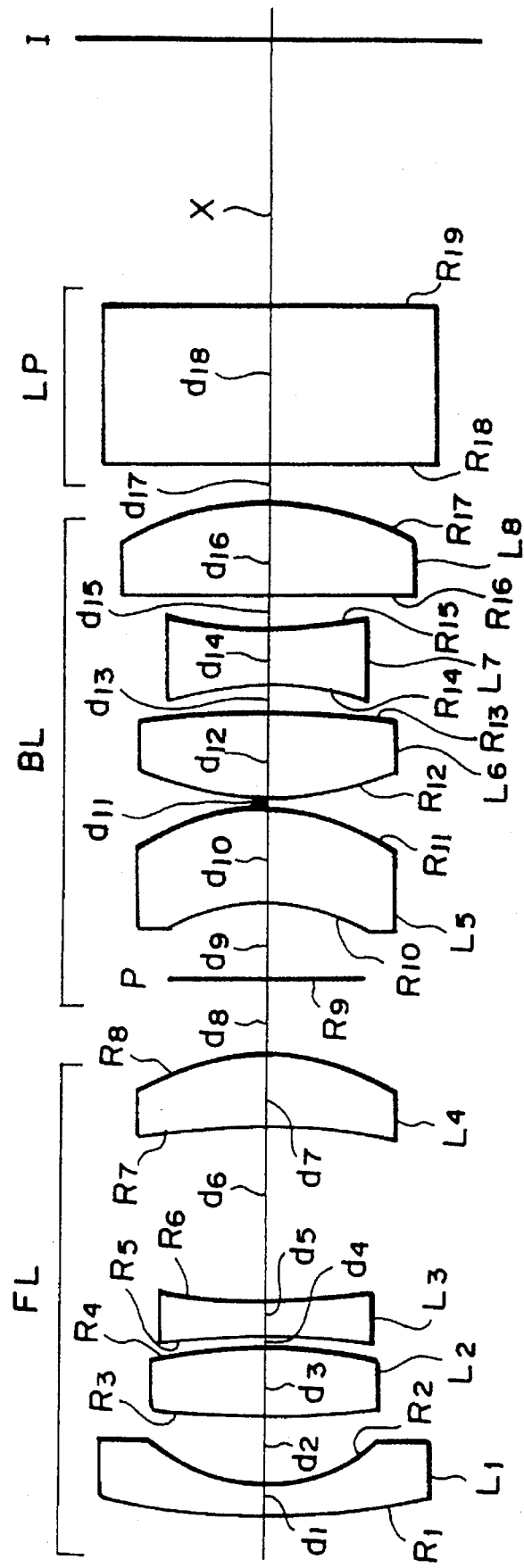
FIG. 1 is a cross-sectional view showing a dual-focal-length lens system for a video camera in which a miniature fixed-focal-length lens system in accordance with a first embodiment of the present invention is employed as the rear lens group.
Figure 2:
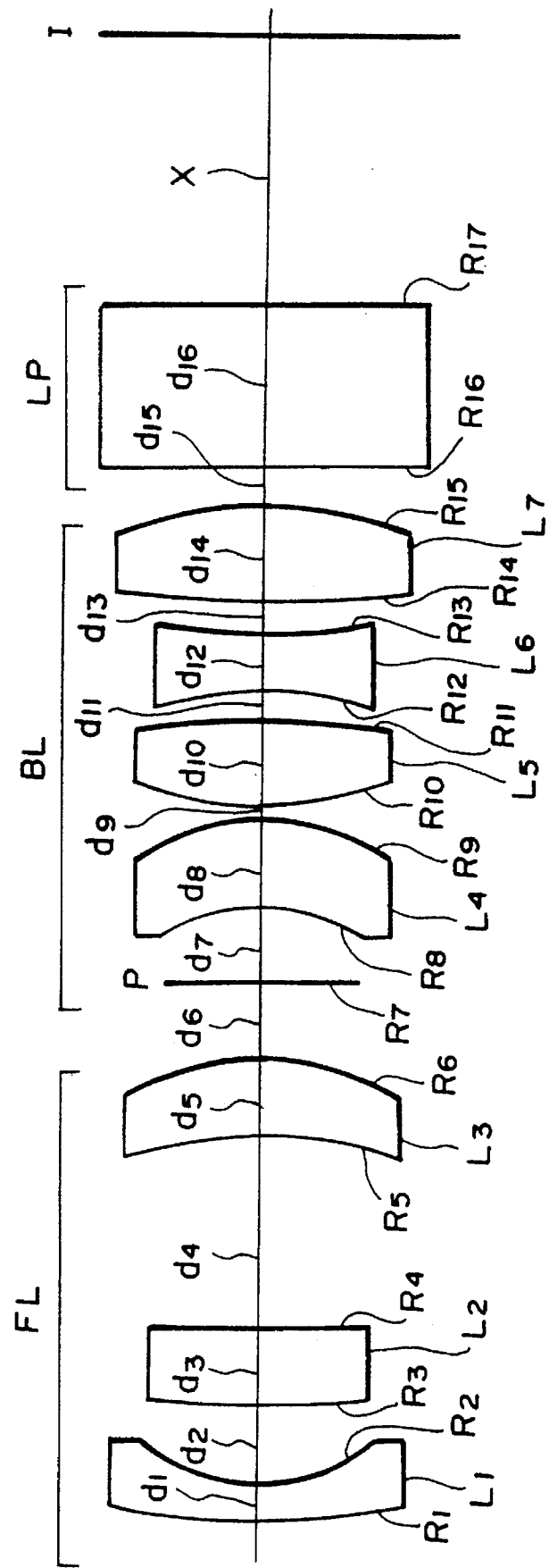
FIG. 2 is a cross-sectional view showing a dual-focal-length lens system for a video camera in which a miniature fixed-focal-length lens system in accordance with a second embodiment of the present invention is employed as the rear lens group.
Figure 3:
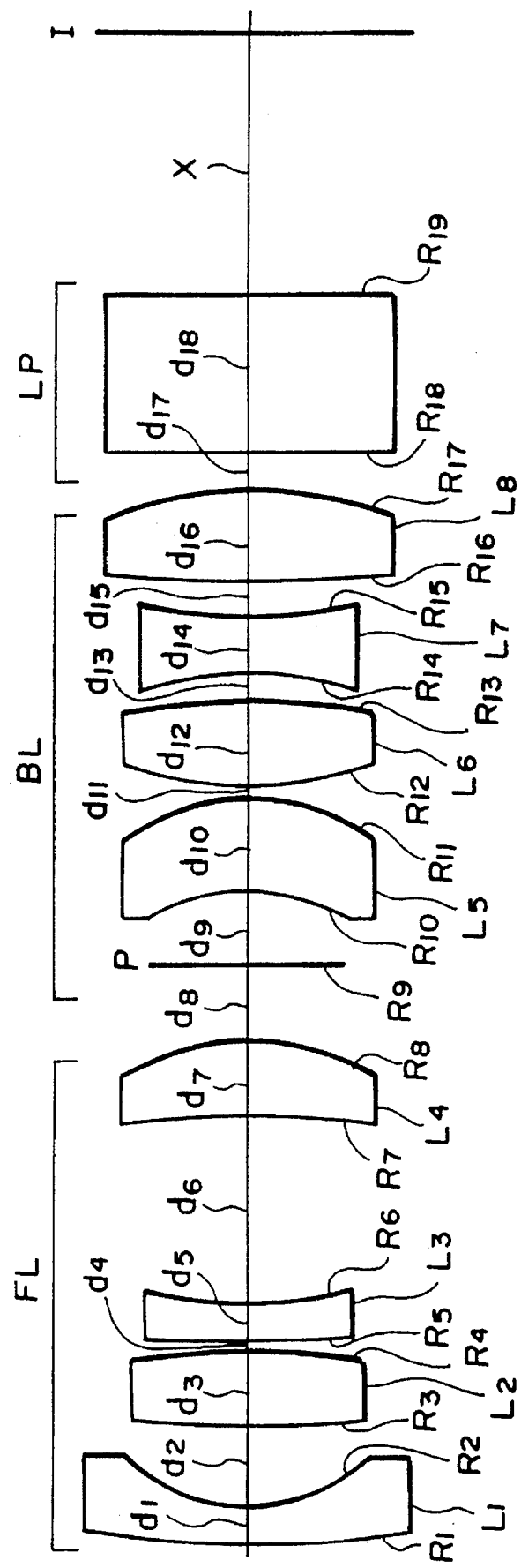
FIG. 3 is a cross-sectional view showing a dual-focal-length lens system for a video camera in which a miniature fixed-focal-length lens system in accordance with a third embodiment of the present invention is employed as the rear lens group, FIGS. 4A to 4C respectively show spherical aberration, astigmatism and distortion of the dual-focal-length lens system shown in FIG. 1, FIGS. 5A to 5C respectively show spherical aberration, astigmatism and distortion of the dual-focal-length length system shown in FIG. 2, FIGS. 6A to 6C respectively show spherical aberration, astigmatism and distortion of the dual-focal-length lens system shown in FIG. 3, and FIGS. 7A and 7B are views for illustrating the problems inherent to the fixed-focal-length lens system in accordance with the prior art.

FIGS. 1 to 3 are cross-sectional views respectively showing dual-focal-length lens systems for a video camera in which miniature fixed-focal-length lens systems in accordance with first to third embodiments of the present invention are employed.

In the description hereinbelow and in the drawings, the radii of curvature of the refracting surfaces, the axial surface separations (the axial air separations or thicknesses of lenses), the refractive indexes for the sodium d-line and the Abbe's numbers of the lenses are respectively designated at R, d, N and ν which are numbered respectively by subscripts in order from front to rear. In this specification, the end of the lens system facing the object will be referred to as "front".

Referring to FIGS. 1 to 3, each of the dual-focal-length lens systems comprises a front lens group FL, a rear lens group BL and a correction prism LP arranged in this order from front (the object side) to rear. An image surface I (e.g., an image surface of a CCD) is disposed on the rear side of the correction prism LP.

The front lens group FL is movable into and away from the optical axis X. When the front lens group FL is on the optical axis X, the dual-focal-length lens system has a shorter focal length (wide angle) and when front lens group FL is away from the optical axis X, the dual-focal-length lens system has a longer focal length.

Each of the fixed-focal-length lens systems in accordance with the first to third embodiments of the present invention is employed as the rear lens group BL.

In the dual-focal-length lens system shown in FIG. 1, the front lens group FL consists of four lenses $L_1$ to $L_4$ arranged in this order from front to rear and has a positive refracting power, and the rear lens group BL consists of four lenses $L_5$ to $L_8$ arranged in this order from front to rear with a stop P disposed in front of the lens $L_5$ and has a positive refracting power.

The dual-focal-length lens system satisfies the following conditions $$10 < |(R_{11}+R_{10})/(R_{11}-R_{10})| < 22$$

$$5 < f_m/f_b < 12$$

wherein fm and fb respectively represent the focal lengths of the lens $L_5$ and the rear lens group BL.

The lens $L_1$ is a negative meniscus lens convex to front, the lens $L_2$ is a double-convex lens having the face of greater curvature faced to rear, the lens $L_3$ is a double-concave lens having the face of greater curvature faced to rear, the lens $L_4$ is a positive meniscus lens convex to rear and concave to front, the lens $L_5$ is a positive meniscus lens convex to rear and concave to front, the lens $L_6$ is a double-convex lens having the face of greater curvature faced to front, the lens $L_7$ is a double-concave lens having the face of greater curvature faced to front and the lens $L_8$ is a double-convex lens having the face of greater curvature faced to rear.

The focal length $f_b$ Of the rear lens group BL, the composite focal length $f_t$ of the front and rear lens groups, F-number $F_{NO}$ and the afocal magnification M of the front lens group FL are as shown in table 1.

TABLE 1

| | |
|---|---|
| focal length $f_b$ of rear lens group (mm) | 11.97 |
| composite focal length $f_t$ (mm) | 5.40 |
| F-number $F_{NO}$ | 2.2 |
| afocal magnification M | 0.45 |

The radii of curvature R(mm) of the refracting surfaces, the axial surface separations d (mm) (the central thicknesses of the lenses or the air separations), the refractive indexes $N_d$ for the sodium d-line of the lenses and the Abbe's numbers νd of the lenses of the dual-focal-length lens system shown in FIG. 1 are as shown in table 2. In table 2, the radii of curvature of the refracting surfaces, the axial surface separations, the refractive indexes for the sodium d-line and the Abbe's numbers of the lenses $L_1$ to $L_8$ and the prism LP are designated in order from front to rear at $R_1$ to $R_{19}$, $d_1$ to $d_{18}$, $N_1$ to $N_9$ and $v_1$ to $v_9$.

TABLE 2

| radius of curvature R | axial surface separation d | refracting index $N_d$ | Abbe's number vd |
|---|---|---|---|
| $R_1 = 19.996$ | $d_1 = 0.8$ | $N_1 = 1.80235$ | $v_1 = 46.7$ |
| $R_2 = 4.540$ | $d_2 = 1.8$ | | |
| $R_3 = 29.695$ | $d_3 = 1.8$ | $N_2 = 1.71736$ | $v_2 = 29.5$ |
| $R_4 = -14.523$ | $d_4 = 0.2$ | | |
| $R_5 = -26.075$ | $d_5 = 1.0$ | $N_3 = 1.77250$ | $v_3 = 49.6$ |
| $R_6 = 21.030$ | $d_6 = 4.6$ | | |
| $R_7 = -18.988$ | $d_7 = 2.0$ | $N_4 = 1.51742$ | $v_4 = 52.2$ |
| $R_8 = -6.298$ | $d_8 = 2.0$ | | |
| $R_9 = \infty$ | $d_9 = 2.0$ | stop | |
| $R_{10} = -5.641$ | $d_{10} = 2.5$ | $N_5 = 1.78500$ | $v_5 = 43.7$ |
| $R_{11} = -6.198$ | $d_{11} = 0.2$ | | |
| $R_{12} = 8.734$ | $d_{12} = 2.3$ | $N_6 = 1.78500$ | $v_6 = 43.7$ |
| $R_{13} = -27.089$ | $d_{13} = 0.7$ | | |
| $R_{14} = -8.736$ | $d_{14} = 1.5$ | $N_7 = 1.84666$ | $v_7 = 23.9$ |
| $R_{15} = 12.261$ | $d_{15} = 0.8$ | | |
| $R_{16} = 370.620$ | $d_{16} = 2.5$ | $N_8 = 1.77250$ | $v_8 = 49.6$ |
| $R_{17} = -8.180$ | $d_{17} = 1.0$ | | |
| $R_{18} = \infty$ | $d_{18} = 4.2$ | $N_9 = 1.51633$ | $v_9 = 64.1$ |
| $R_{19} = \infty$ | | | |

In the dual-focal-length lens system shown in FIG. 2, the front lens group FL consists of three lenses $L_1$ to $L_3$ arranged in this order from front to rear and has a positive refracting power, and the rear lens group BL consists of four lenses $L_4$ to $L_7$ arranged in this order from front to rear with a stop P disposed in front of the lens $L_4$ and has a positive refracting power.

The dual-focal-length lens system satisfies the following conditions $$10 < |(R_9+R_8)/(R_9-R_8)| < 22$$

$$5 < f_m/f_b < 12$$

wherein fm and fb respectively represent the focal lengths of the lens $L_4$ and the rear lens group BL.

The lens $L_1$ is a negative meniscus lens convex to front, the lens $L_2$ is a positive meniscus lens convex to front, the lens $L_3$ is a positive meniscus lens convex to rear, the lens $L_4$ is a positive meniscus lens convex to rear and concave to front, the lens $L_5$ is a double-convex lens having the face of greater curvature faced to front, the lens $L_6$ is a double-concave lens having the face of greater curvature faced to front, and the lens $L_7$ is a double-convex lens having the face of greater curvature faced to rear.

The focal length $f_b$ of the rear lens group BL, the composite focal length $f_t$ of the front and rear lens groups, F-number $F_{NO}$ and the afocal magnification M of the front lens group FL are as shown in table 3.

TABLE 3

| | |
|---|---|
| focal length $f_b$ of rear lens group (mm) | 11.98 |
| composite focal length $f_t$ (mm) | 6.13 |
| F-number $F_{NO}$ | 2.2 |
| afocal magnification M | 0.51 |

The radii of curvature R(mm) of the refracting surfaces, the axial surface separations d (mm) (the central thicknesses of the lenses or the air separations), the refractive indexes $N_d$ for the sodium d-line of the lenses and the Abbe's numbers vd of the lenses of the dual-focal-length lens system shown in FIG. 1 are as shown in table 4. In table 4, the radii of curvature of the refracting surfaces, the axial surface separations, the refractive indexes for the sodium d-line and the Abbe's numbers of the lenses $L_1$ to $L_7$ and the prism LP are designated in order from front to rear at $R_1$ to $R_{17}$, $d_1$ to $d_{16}$, $N_1$ to $N_8$ and $v_1$ to $v_8$.

TABLE 4

| radius of curvature R | axial surface separation d | refracting index $N_d$ | Abbe's number vd |
|---|---|---|---|
| $R_1 = 19.508$ | $d_1 = 1.0$ | $N_1 = 1.71300$ | $v_1 = 53.9$ |
| $R_2 = 4.838$ | $d_2 = 2.0$ | | |
| $R_3 = 31.435$ | $d_3 = 2.0$ | $N_2 = 1.80518$ | $v_2 = 25.5$ |
| $R_4 = 80.325$ | $d_4 = 5.0$ | | |
| $R_5 = -12.134$ | $d_5 = 2.0$ | $N_3 = 1.71300$ | $v_3 = 53.9$ |
| $R_6 = -7.279$ | $d_6 = 2.0$ | | |
| $R_7 = \infty$ | $d_7 = 2.0$ | stop | |
| $R_8 = -5.195$ | $d_8 = 2.5$ | $N_4 = 1.78500$ | $v_4 = 43.7$ |
| $R_9 = -6.000$ | $d_9 = 0.2$ | | |
| $R_{10} = 9.789$ | $d_{10} = 2.3$ | $N_5 = 1.78500$ | $v_5 = 43.7$ |
| $R_{11} = -20.227$ | $d_{11} = 0.7$ | | |
| $R_{12} = -9.415$ | $d_{12} = 1.5$ | $N_6 = 1.84666$ | $v_6 = 23.9$ |
| $R_{13} = 13.991$ | $d_{13} = 0.8$ | | |
| $R_{14} = 42.130$ | $d_{14} = 2.5$ | $N_7 = 1.77250$ | $v_7 = 49.6$ |
| $R_{15} = -10.832$ | $d_{15} = 1.0$ | | |
| $R_{16} = \infty$ | $d_{16} = 4.2$ | $N_8 = 1.51633$ | $v_8 = 64.1$ |
| $R_{17} = \infty$ | | | |

In the dual-focal-length lens system shown in FIG. 3, the front lens group FL consists of four lenses $L_1$ to $L_4$ arranged in this order from front to rear and has a positive refracting power, and the rear lens group BL consists of four lenses $L_5$ to $L_8$ arranged in this order from front to rear with a stop P disposed in front of the lens $L_5$ and has a positive refracting power.

The dual-focal-length lens system satisfies the following conditions $$10 < |(R_{11}+R_{10})/(R_{11}-R_{10})| < 22$$

$$5 < f_m/f_b < 12$$

wherein fm and fb respectively represent the focal lengths of the lens $L_5$ and the rear lens group BL.

The lens $L_1$ is a negative meniscus lens convex to front, the lens $L_2$ is a double-convex lens having the face of greater curvature faced to rear, the lens $L_3$ is a negative meniscus lens convex to front, the lens $L_4$ is a positive meniscus lens convex to rear and concave to front, the lens $L_5$ is a positive meniscus lens convex to rear and concave to front, the lens $L_6$ is a double-convex lens having the face of greater curvature faced to front, the lens $L_7$ is a double-concave lens having the face of greater curvature faced to front and the lens $L_8$ is a double-convex lens having the face of greater curvature faced to rear.

The focal length $f_b$ of the rear lens group BL, the composite focal length $f_t$ of the front and rear lens groups, F-number $F_{NO}$ and the afocal magnification M of the front lens group FL are as shown in table 5.

TABLE 5

| | |
|---|---|
| focal length $f_b$ of rear lens group (mm) | 11.94 |
| composite focal length $f_t$ (mm) | 5.22 |
| F-number $F_{NO}$ | 2.2 |
| afocal magnification M | 0.44 |

The radii of curvature R(mm) of the refracting surfaces, the axial surface separations d (mm) (the central thicknesses of the lenses or the air separations), the refractive indexes $N_d$ for the sodium d-line of the lenses and the Abbe's numbers vd of the lenses of the dual-focal-length lens system shown in FIG. 3 are as shown in table 6. In table 6, the radii of curvature of the refracting surfaces, the axial surface separations, the refractive indexes for the sodium d-line and the Abbe's numbers of the lenses $L_1$ to $L_8$ and the prism LP are designated in order from front to rear at $R_1$ to $R_{19}$, $d_1$ to $d_{18}$, $N_1$ to $N_9$ and $v_1$ to $v_1$ to $v_9$.

TABLE 6

| radius of curvature R | axial surface separation d | refracting index $N_d$ | Abbe's number vd |
|---|---|---|---|
| $R_1 = 27.972$ | $d_1 = 1.0$ | $N_1 = 1.80235$ | $v_1 = 46.7$ |
| $R_2 = 4.946$ | $d_2 = 2.0$ | | |
| $R_3 = 32.270$ | $d_3 = 1.8$ | $N_2 = 1.71736$ | $v_2 = 29.5$ |
| $R_4 = -20.734$ | $d_4 = 0.2$ | | |
| $R_5 = 63.372$ | $d_5 = 1.0$ | $N_3 = 1.77250$ | $v_3 = 49.6$ |
| $R_6 = 11.673$ | $d_6 = 5.0$ | | |
| $R_7 = -26.807$ | $d_7 = 2.0$ | $N_4 = 1.51742$ | $v_4 = 52.2$ |
| $R_8 = -6.907$ | $d_8 = 2.0$ | | |
| $R_9 = \infty$ | $d_9 = 2.0$ | stop | |
| $R_{10} = -5.275$ | $d_{10} = 2.5$ | $N_5 = 1.78500$ | $v_5 = 43.7$ |
| $R_{11} = -6.000$ | $d_{11} = 0.2$ | | |
| $R_{12} = 9.789$ | $d_{12} = 2.3$ | $N_6 = 1.78500$ | $v_6 = 43.7$ |
| $R_{13} = -20.227$ | $d_{13} = 0.7$ | | |
| $R_{14} = -9.415$ | $d_{14} = 1.5$ | $N_7 = 1.84666$ | $v_7 = 23.9$ |
| $R_{15} = 13.991$ | $d_{15} = 0.8$ | | |
| $R_{16} = 42.130$ | $d_{16} = 2.5$ | $N_8 = 1.77250$ | $v_8 = 49.6$ |
| $R_{17} = -11.014$ | $d_{17} = 1.0$ | | |
| $R_{18} = \infty$ | $d_{18} = 4.2$ | $N_9 = 1.51633$ | $v_9 = 64.1$ |
| $R_{19} = \infty$ | | | |

Figure 4C:
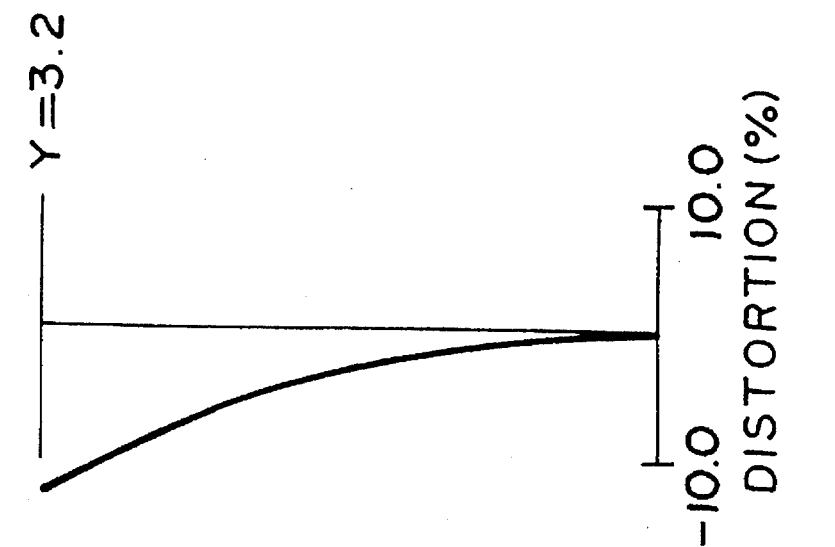
Figure 4B:
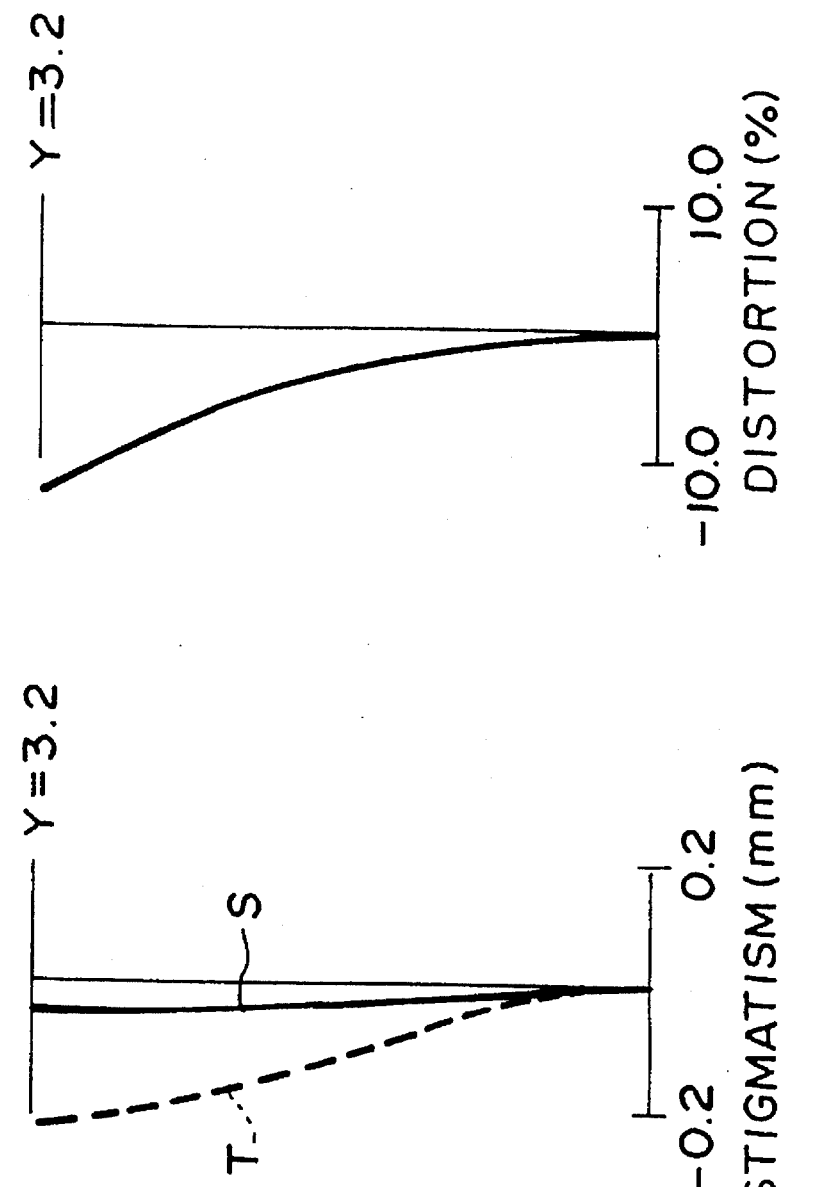
Figure 4A:
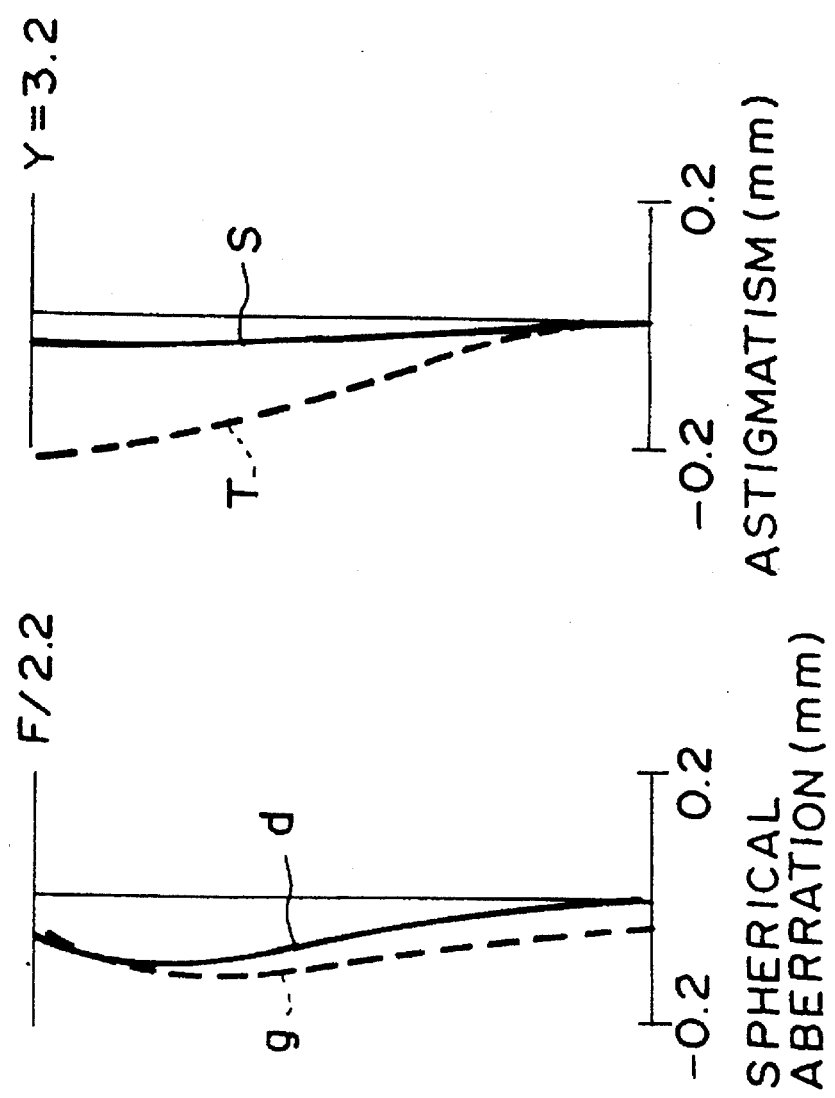

FIGS. 4A to 4C respectively show spherical aberration, astigmatism and distortion of the dual-focal-length lens system shown in FIG. 1, FIGS. 5A to 5C respectively show spherical aberration, astigmatism and distortion of the dual-focal-length lens system shown in FIG. 2, and FIGS. 5A to 5C respectively show spherical aberration, astigmatism and distortion of the dual-focal-length lens system shown in FIG. 3.

As can be understood from FIGS. 4A to 6C, the dual-focal-length lens systems shown in FIGS. 1 to 3 in which the fixed-focal-length lens systems in accordance with the first to third embodiments of the present invention are employed have excellent optical performances.

The arrangement of the fixed-focal-length lens system in accordance with the present invention need not be limited to those described above in conjunction with the first to third embodiments, but the number of the lens elements of each lens group, the radius of curvature of each lens element and the like may be variously modified without departing from the spirit and scope of the invention.

Further, though the fixed-focal-length lens system of the present invention is especially useful as the rear lens group of a dual-focal-length lens system, it can be used as a telephoto lens by itself.

What is claimed is;

1. A miniature fixed-focal-length lens system comprising a lens group which consists of a plurality of lenses and has a positive refracting power and a stop disposed on the object side of the lens group characterized in that the lens nearest to the object in the lens group is a meniscus lens which is concave to front and has a positive refracting power and the lens remotest from the object in the lens group is a lens which is convex to rear and has a positive refracting power, wherein the lens system satisfies the following condition $$10<|(R_2+R_1)/(R_2-R_1)|<22$$

wherein $R_1$ and $R_2$ respectively represent the radii of curvature of the front and rear faces of the meniscus lens.

2. The lens system of claim 1 wherein each of the lenses in said lens group is fixed in position relative to the other lenses in the group and said meniscus lens is fixed in a frontmost position, closer to the object than any other lenses in the group having fixed positions with respect to said meniscus lens.

3. The lens system of claim 1 further comprising a front lens group located on the object side of said lens group with said stop between said lens group and said front lens group.

4. The lens system of claim 3 wherein said front lens group is movable with respect to said lens group.

5. A miniature fixed-focal-length lens system as defined in claim 1 which satisfies the following condition $$5<f_m/f_b<12$$

wherein $f_m$ and $f_b$ respectively represent the focal lengths of the meniscus lens and the overall lens system.

6. A miniature fixed-focal-length lens system comprising a lens group which consists of a plurality of lenses and has a positive refracting power and a stop disposed on the object side of the lens group characterized in that the lens nearest to the object in the lens group is a meniscus lens which is concave to front and has a positive refracting power and the lens remotest from the object in the lens group is a lens which is convex to rear and has a positive refracting power, wherein the lens system satisfies the following condition $$5<f_m/f_b<12$$

wherein $f_m$ and $f_b$ respectively represent the focal lengths of the meniscus lens and the overall lens system.

7. The lens system of claim 6 wherein each of the lenses in said lens group is fixed in position relative to the other lenses in the group and said meniscus lens is fixed in a frontmost position, closer to the object than any other lenses in the group having fixed positions with respect to said meniscus lens.

8. The lens system of claim 6 further comprising a front lens group located on the object side of said lens group with said stop between said lens group and said front lens group.

9. The lens system of claim 8 wherein said front lens group is movable with respect to said lens group.

10. A dual-focal-length lens system comprising front lens group, a rear lens group and a correction prism arranged in this order from front to rear with a stop disposed between the front and rear lens group, the front lens group being movable into and away from the optical axis to change the focal length of the dual-focal-length lens system, characterized in that the lens nearest to the object in the rear lens group is a meniscus lens which is concave to front and has a positive refracting power and the lens remotest from the object in the rear lens group is a lens which is convex to rear and has a positive refracting power.

11. A dual-focal-length lens system as defined in claim 10 in which said rear lens group satisfies the following condition $$10<|(R_2+R_1)/(R_2-R_1)|<22$$

wherein R1 and R2 respectively represent the radii of curvature of the front and rear faces of said meniscus lens.

12. A dual-focal-length lens system as defined in claim 10 or 11 which in which said rear lens group satisfies the following condition $$5<f_m/f_b<12$$

wherein fm and fb respectively represent the focal lengths of the meniscus lens and the overall rear lens system.

13. A dual-focal-length lens system as defined in claim 10 in which said front lens group consists of four lenses $L_1$ to $L_4$ arranged in this order from front to rear and has a positive refracting power, and said rear lens group consists of four lenses $L_5$ to $L_8$ arranged in this order from front to rear with said stop disposed between the lens $L_4$ and the lens $L_5$ and has a positive refracting power, the lens $L_1$ being a negative meniscus lens convex to front, the lens $L_2$ being a double-convex lens having the face of greater curvature faced to rear, the lens $L_3$ being a double-concave lens having the face of greater curvature faced to rear, the lens $L_4$ being a positive meniscus lens convex to rear and concave to front, the lens $L_5$ being a positive meniscus lens convex to rear and concave to front, the lens $L_6$ being a double-convex lens having the face of greater curvature faced to front, the lens $L_7$ being a double-concave lens having the face of greater curvature faced to front and the lens $L_8$ being a double-convex lens having the face of greater curvature faced to rear wherein the following conditions are satisfied,

| | | | |
|---|---|---|---|
| $R_1 = 19.996$ | $d_1 = 0.8$ | $N_1 = 1.80235$ | $v_1 = 46.7$ |
| $R_2 = 4.540$ | $d_2 = 1.8$ | | |
| $R_3 = 29.695$ | $d_3 = 1.8$ | $N_2 = 1.71736$ | $v_2 = 29.5$ |
| $R_4 = -14.523$ | $d_4 = 0.2$ | | |
| $R_5 = -26.075$ | $d_5 = 1.0$ | $N_3 = 1.77250$ | $v_3 = 49.6$ |
| $R_6 = 21.030$ | $d_6 = 4.6$ | | |
| $R_7 = -18.988$ | $d_7 = 2.0$ | $N_4 = 1.51742$ | $v_4 = 52.2$ |
| $R_8 = -6.298$ | $d_8 = 2.0$ | | |
| $R_9 = \infty$ | $d_9 = 2.0$ | stop | |
| $R_{10} = -5.641$ | $d_{10} = 2.5$ | $N_5 = 1.78500$ | $v_5 = 43.7$ |
| $R_{11} = -6.198$ | $d_{11} = 0.2$ | | |
| $R_{12} = 8.734$ | $d_{12} = 2.3$ | $N_6 = 1.78500$ | $v_6 = 43.7$ |
| $R_{13} = -27.089$ | $d_{13} = 0.7$ | | |
| $R_{14} = -8.736$ | $d_{14} = 1.5$ | $N_7 = 1.84666$ | $v_7 = 23.9$ |
| $R_{15} = 12.261$ | $d_{15} = 0.8$ | | |
| $R_{16} = 370.620$ | $d_{16} = 2.5$ | $N_8 = 1.77250$ | $v_8 = 49.6$ |
| $R_{17} = -8.180$ | $d_{17} = 1.0$ | | |
| $R_{18} = \infty$ | $d_{18} = 4.2$ | $N_9 = 1.51633$ | $v_9 = 64.1$ |
| $R_{19} = \infty$ | | | | where the radii of curvature of the refracting surfaces, the axial surface separations, the refractive indexes for the sodium d-line and the Abbe's numbers of the lenses $L_1$ to $L_8$ and the correction prism are designated in order from front to rear at $R_1$ to $R_{19}$, $d_1$ to $d_{18}$, $N_1$ to $N_9$ and $v_1$ to $v_9$.

14. A dual-focal-length lens system as defined in claim 10 in which said front lens group consists of three lenses $L_1$ to $L_3$ arranged in this order from front to rear and has a positive refracting power, and the rear lens group consists of four lenses $L_4$ to $L_7$ arranged in this order from front to rear with said stop disposed between the lens $L_3$ and the lens $L_4$ and has a positive refracting power, the lens $L_1$ being a negative meniscus lens convex to front, the lens $L_2$ being a positive meniscus lens convex to front, the lens $L_3$ being a positive meniscus lens convex to rear, the lens $L_4$ being a positive meniscus lens convex to rear and concave to front, the lens $L_5$ being a double-convex lens having the face of greater curvature faced to front, the lens $L_6$ being a double-concave lens having the face of greater curvature faced to front, and the lens $L_7$ being a double-convex lens having the face of greater curvature faced to rear, wherein the following conditions are satisfied,

| | | | |
|---|---|---|---|
| $R_1 = 19.508$ | $d_1 = 1.0$ | $N_1 = 1.71300$ | $v_1 = 53.9$ |
| $R_2 = 4.838$ | $d_2 = 2.0$ | | |
| $R_3 = 31.435$ | $d_3 = 2.0$ | $N_2 = 1.80518$ | $v_2 = 25.5$ |
| $R_4 = 80.325$ | $d_4 = 5.0$ | | |
| $R_5 = -12.134$ | $d_5 = 2.0$ | $N_3 = 1.71300$ | $v_3 = 53.9$ |
| $R_6 = -7.279$ | $d_6 = 2.0$ | | |
| $R_7 = \infty$ | $d_7 = 2.0$ | stop | |
| $R_8 = -5.195$ | $d_8 = 2.5$ | $N_4 = 1.78500$ | $v_4 = 43.7$ |
| $R_9 = -6.000$ | $d_9 = 0.2$ | | |
| $R_{10} = 9.789$ | $d_{10} = 2.3$ | $N_5 = 1.78500$ | $v_5 = 43.7$ |
| $R_{11} = -20.227$ | $d_{11} = 0.7$ | | |
| $R_{12} = -9.415$ | $d_{12} = 1.5$ | $N_6 = 1.84666$ | $v_6 = 23.9$ |
| $R_{13} = 13.991$ | $d_{13} = 0.8$ | | |
| $R_{14} = 42.130$ | $d_{14} = 2.5$ | $N_7 = 1.77250$ | $v_7 = 49.6$ |
| $R_{15} = -10.832$ | $d_{15} = 1.0$ | | |
| $R_{16} = \infty$ | $d_{16} = 4.2$ | $N_8 = 1.51633$ | $v_8 = 64.1$ |
| $R_{17} = \infty$ | | | | where the radii of curvature of the refracting surfaces, the axial surface separations, the refractive indexes for the sodium d-line and the Abbe's numbers of the lenses $L_1$ to $L_7$ and the prism are designated in order from front to rear at $R_1$ to $R_{17}$, $d_1$ to $d_{16}$, $N_1$ to $N_8$ and $v_1$ to $v_8$.

15. A dual-focal-length lens system as defined in claim 10 in which said front lens group consists of four lenses $L_1$ to $L_4$ arranged in this order from front to rear and has a positive refracting power, and said rear lens group consists of four lenses $L_5$ to $L_8$ arranged in this order from front to rear with said stop disposed between the lens $L_4$ and the lens $L_5$ and has a positive refracting power, the lens $L_1$ being a negative meniscus lens convex to front, the lens $L_2$ being a double-convex lens having the face of greater curvature faced to rear, the lens $L_3$ being a negative meniscus lens convex to front, the lens $L_4$ being a positive meniscus lens convex to rear and concave to front, the lens $L_5$ being a positive meniscus lens convex to rear and concave to front, the lens $L_6$ being a double-convex lens having the face of greater curvature faced to front, the lens $L_7$ being a double-concave lens having the face of greater curvature faced to front and the lens $L_8$ being a double-convex lens having the face of greater curvature faced to rear, wherein the following conditions are satisfied,

| | | | |
|---|---|---|---|
| $R_1 = 27.972$ | $d_1 = 1.0$ | $N_1 = 1.80235$ | $v_1 = 46.7$ |
| $R_2 = 4.946$ | $d_2 = 2.0$ | | |
| $R_3 = 32.270$ | $d_3 = 1.8$ | $N_2 = 1.71736$ | $v_2 = 29.5$ |
| $R_4 = -20.734$ | $d_4 = 0.2$ | | |
| $R_5 = 63.372$ | $d_5 = 1.0$ | $N_3 = 1.77250$ | $v_3 = 49.6$ |
| $R_6 = 11.673$ | $d_6 = 5.0$ | | |
| $R_7 = -26.807$ | $d_7 = 2.0$ | $N_4 = 1.51742$ | $v_4 = 52.2$ |
| $R_8 = -6.907$ | $d_8 = 2.0$ | | |
| $R_9 = \infty$ | $d_9 = 2.0$ | stop | |
| $R_{10} = -5.275$ | $d_{10} = 2.5$ | $N_5 = 1.78500$ | $v_5 = 43.7$ |
| $R_{11} = -6.000$ | $d_{11} = 0.2$ | | |
| $R_{12} = 9.789$ | $d_{12} = 2.3$ | $N_6 = 1.78500$ | $v_6 = 43.7$ |
| $R_{13} = -20.227$ | $d_{13} = 0.7$ | | |
| $R_{14} = -9.415$ | $d_{14} = 1.5$ | $N_7 = 1.84666$ | $v_7 = 23.9$ |
| $R_{15} = 13.991$ | $d_{15} = 0.8$ | | |
| $R_{16} = 42.130$ | $d_{16} = 2.5$ | $N_8 = 1.77250$ | $v_8 = 49.6$ |
| $R_{17} = -11.014$ | $d_{17} = 1.0$ | | |
| $R_{18} = \infty$ | $d_{18} = 4.2$ | $N_9 = 1.51633$ | $v_9 = 64.1$ |
| $R_{19} = \infty$ | | | | where the radii of curvature of the refracting surfaces, the axial surface separations, the refractive indexes for the sodium d-line and the Abbe's numbers of the lenses $L_1$ to $L_8$ and the prism are designated in order from front to rear at $R_1$ to $R_{19}$, $d_1$ to $d_{18}$, $N_1$ to $N_9$ and $v_1$ to $v_9$.

16. The lens system of claim 10 wherein the lens nearest to the object in the rear lens group is convex to the rear.

17. The lens system of claim 10 wherein the lens system consists essentially of said front lens group, said rear lens group, said correction prism, and said stop.

18. The lens system of claim 10 wherein the front lens group is the nearest lens group in the lens system to the object.

* * * * *